(12) United States Patent
Sagen

(10) Patent No.: US 11,370,257 B1
(45) Date of Patent: Jun. 28, 2022

(54) TOWING HITCH SHIFTING FORK ASSEMBLY

(71) Applicant: Robert C. Sagen, Arthur, ND (US)

(72) Inventor: Robert C. Sagen, Arthur, ND (US)

( * ) Notice: Subject to any disclaimer, the term of this patent is extended or adjusted under 35 U.S.C. 154(b) by 116 days.

(21) Appl. No.: 17/006,911

(22) Filed: Aug. 31, 2020

Related U.S. Application Data

(60) Provisional application No. 62/894,691, filed on Aug. 31, 2019.

(51) Int. Cl.
  *B60D 1/28* (2006.01)
  *B60D 1/06* (2006.01)
(52) U.S. Cl.
  CPC ............... *B60D 1/28* (2013.01); *B60D 1/065* (2013.01)
(58) Field of Classification Search
  CPC ... B60D 1/00; B60D 1/24; B60D 1/28; B60D 1/36; B60D 1/58; B60D 1/64; B60D 1/01; B60D 1/02; B60D 1/025; B60D 1/06; B60D 1/065
  See application file for complete search history.

(56) References Cited

U.S. PATENT DOCUMENTS 9,855,804 B1 * 1/2018 Kirkconnell ............. B60D 1/28
10,549,589 B1 * 2/2020 Burress .................. B60D 1/065

FOREIGN PATENT DOCUMENTS

AU          9516330 A  * 10/1995  ............... B60D 1/28

* cited by examiner

*Primary Examiner* — Jacob D Knutson
*Assistant Examiner* — Abigail R Hymel
(74) *Attorney, Agent, or Firm* — Johnson and Phung; Thomas N. Phung

(57) ABSTRACT

A trailer hitch ball mount locking apparatus that includes a locking rod assembly having a main body with a slidable rod extending from each end of the main body, a trailer hitch coupler having a hitch ball socket for receiving a hitch ball therein and a pair of rail slots for receiving and supporting a free end of the corresponding slidable rod of the locking rod assembly therein, and a shifting fork pivotably connected to the trailer hitch coupler with the shifting fork having a hand gripping end and a slotted end with a surface for engaging a portion of the main body of the locking rod assembly to guide the locking rod assembly between an open gate condition and a closed gate condition.

17 Claims, 4 Drawing Sheets

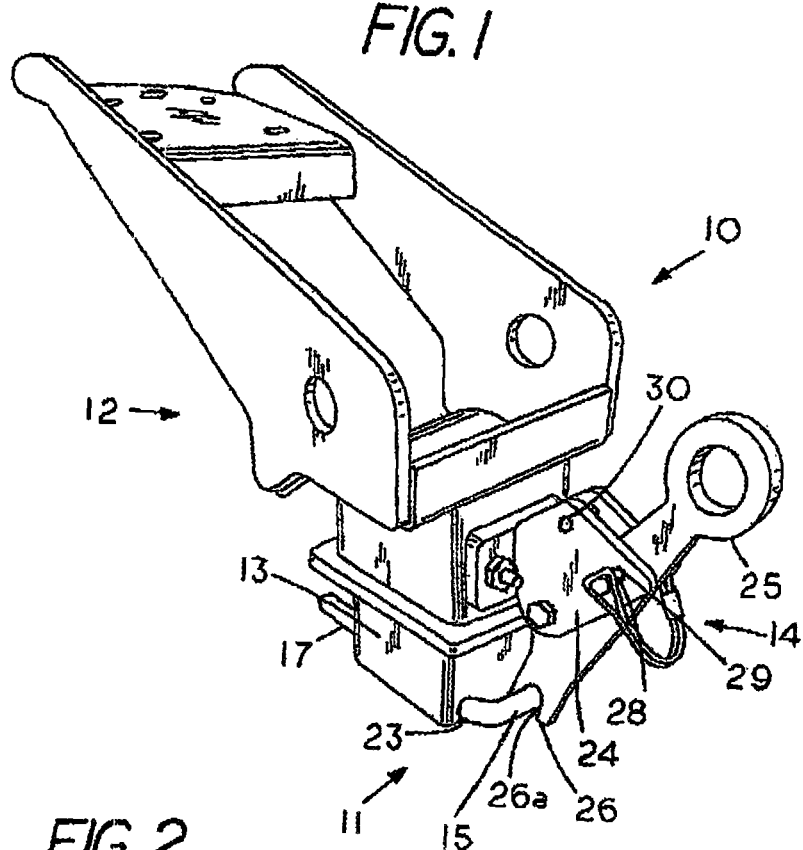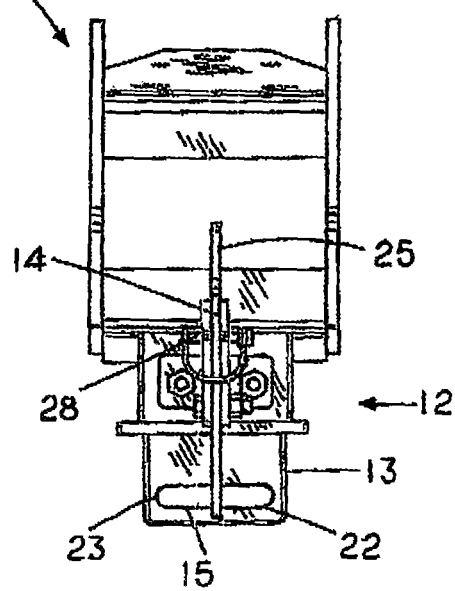

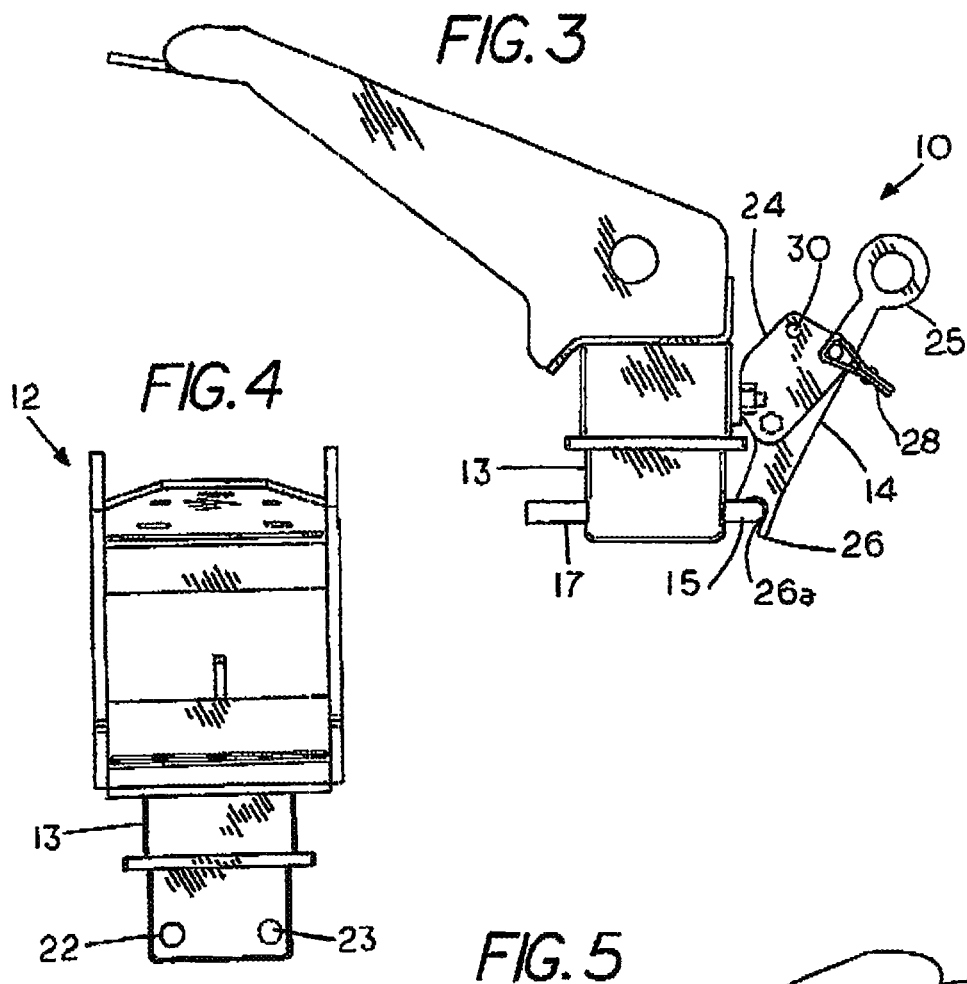
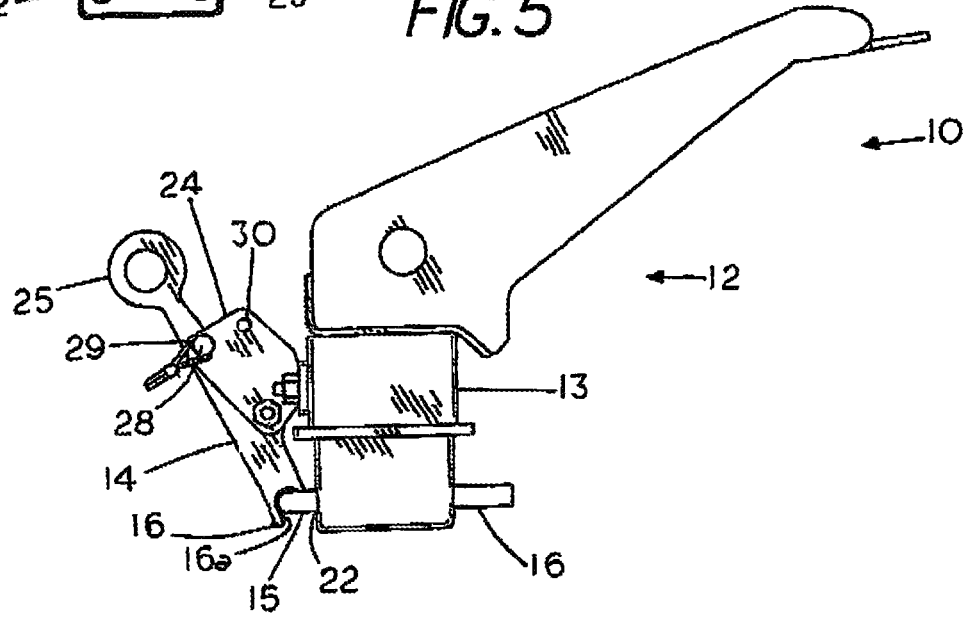

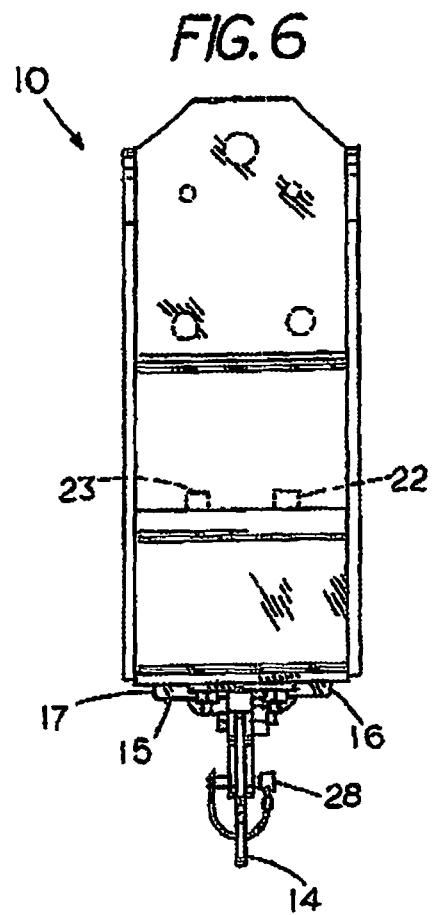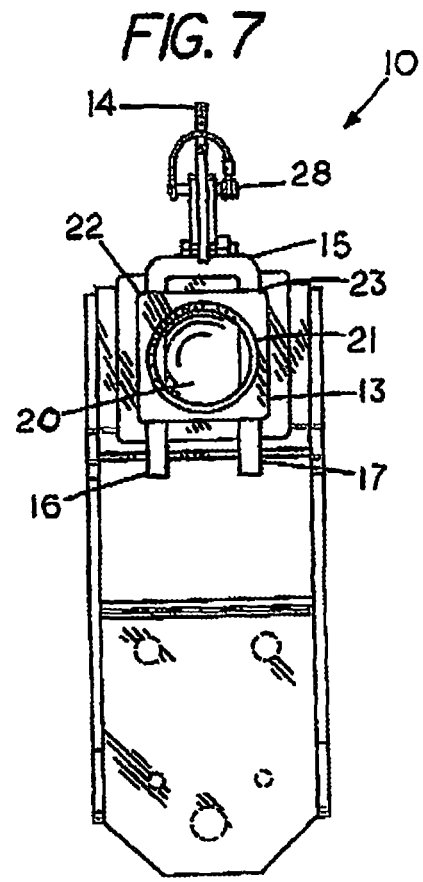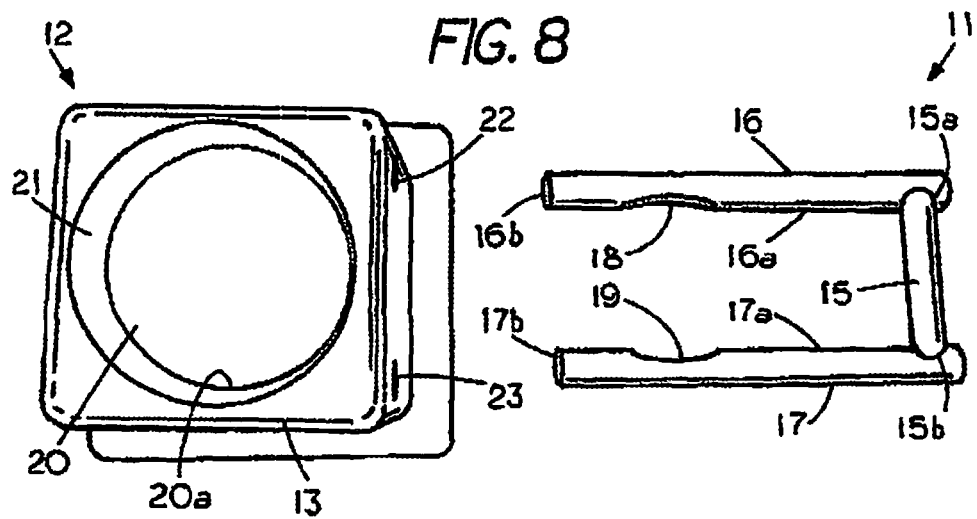

TOWING HITCH SHIFTING FORK ASSEMBLY

FIELD OF INVENTION

The field of the invention relates generally to automobile towing hitch, and more particularly to a new trailer hitch ball mount locking apparatus to provide the user with greater ease and safety in locking and unlocking a trailer hitch ball mount to a towing vehicle.

CROSS REFERENCE TO RELATED APPLICATIONS

This application claims priority to currently U.S. Provisional Application Ser. No. 62/894,691; filed on Aug. 31, 2019; titled TOWING HITCH SHIFTING FORK ASSEMBLY and pending U.S. Design Application Serial No. 29/704,083; filed on Aug. 31, 2019; titled TOWING HITCH WITH SHIFTING FORK.

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of hitch connectors is known in the prior art. More specifically, hitch connectors heretofore devised and utilized are known to consist basically of familiar, expected and obvious structural configurations, notwithstanding the myriad of designs encompassed by the crowded prior art which have been developed for the fulfillment of countless objectives and requirements.

The present invention comprises new trailer hitch ball mount locking apparatus that provides the user with greater ease and safety in locking and unlocking a trailer hitch that is mountable to a hitch ball of a towing vehicle.

SUMMARY OF THE INVENTION

Briefly, the present invention comprises a trailer hitch ball mount locking apparatus having a locking rod assembly, a trailer hitch, and a shifting fork. The locking rod assembly includes a main body having a slidable rod extending from proximal each end of the main body of the locking rod assembly. The slidable rods each extend in a corresponding parallel direction from each other and perpendicular to the main body and include diametrically opposing grooves located on an interior side of each of the slidable rods.

The trailer hitch includes a trailer hitch coupler with a hitch ball socket having a bevel rim allowing for additional play and angular movement between the hitch ball socket and a shaft portion of a hitch ball. The trailer hitch coupler also includes a pair of rail slots for receiving and supporting a free end of the corresponding slidable rod of the locking rod assembly therein.

The shifting fork is pivotably connected to the trailer hitch coupler by a mounting bracket and includes a hand gripping end and a slotted end. The slotted end includes a surface for engaging a portion of the main body of the locking rod assembly to guide the locking rod assembly between an open gate condition identified by the alignment of the diametrically opposing grooves of the pair of slidable rods with an opening of the ball socket to allow coupling and decoupling of a hitch ball with the trailer hitch coupler and a closed gate condition preventing the coupling and decoupling of the hitch ball with the trailer hitch coupler.

The mounting bracket may include a shifting fork locking mechanism to maintain the shift fork in either the open gate condition or the closed gate condition such as a locking pin mountable to at least one locking pin hole located on the mounting backet and a corresponding locking pin hole located on the shifting fork.

BRIEF DESCRIPTION OF THE DRAWINGS

FIG. 1 is a perspective view showing an embodiment of a trailer hitch ball mount locking apparatus of the present invention;

FIG. 2 is a front view of the trailer hitch ball mount locking apparatus of FIG. 1;

FIG. 3 is a left side elevation view of the trailer hitch ball mount locking apparatus of FIG. 1;

FIG. 4 is a rearview of the trailer hitch ball mount locking apparatus of FIG. 1;

FIG. 5 is right side elevation view of the trailer hitch ball mount locking apparatus of FIG. 1;

FIG. 6 is a top view showing the trailer hitch ball mount locking apparatus of FIG. 1.

FIG. 7 is a bottom view showing the trailer hitch ball mount locking apparatus of FIG. 1;

FIG. 8 is a close-up perspective view showing an embodiment of a locking rod assembly and trailer hitch coupler of FIG. 1

DESCRIPTION OF THE PREFERRED EMBODIMENT

Figure 9:
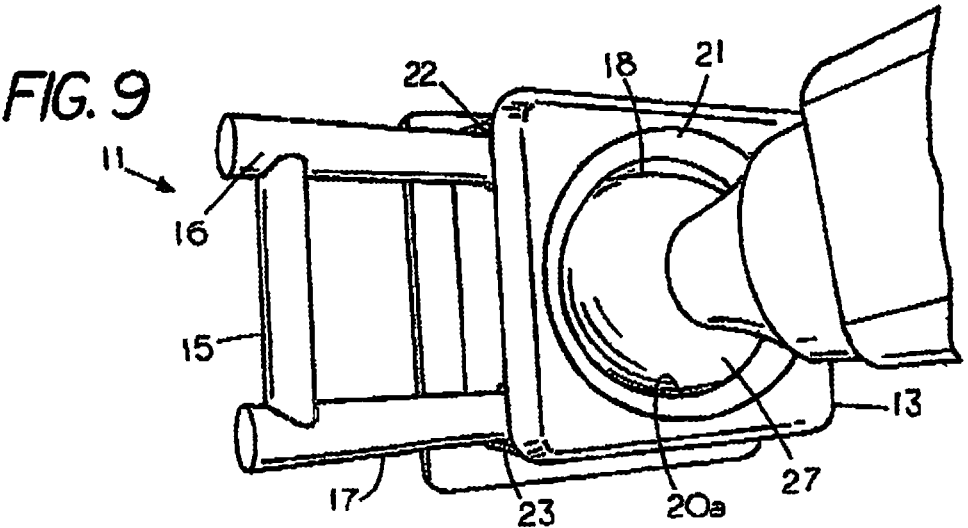
FIG. 9 is a close-up perspective view showing the trailer hitch ball mount locking apparatus of FIG. 1 in an open gate condition.

The general purpose of the present invention, which will be described subsequently in greater detail, is to provide a new trailer hitch ball mount locking apparatus to provide the user with greater ease and safety in locking and unlocking a trailer hitch ball mount to the towing vehicle.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

Referring to FIGS. 1-7, FIG. 1 is a perspective view showing an embodiment of a trailer hitch ball mount locking apparatus 10 of the present invention. FIG. 2 is a front view, FIG. 3 is a left side elevation view, FIG. 4 is a rearview, and FIG. 5 is right side elevation view of the trailer hitch ball mount locking apparatus 10 of FIG. 1. FIG. 6 is a top view and FIG. 7 is a bottom view showing the trailer hitch ball mount locking apparatus 10 of FIG. 1.

The trailer hitch ball mount locking apparatus 10 generally comprises a locking rod assembly 11, a trailer hitch 12 having a trailer hitch coupler 13, and a shifting fork 14.

FIG. 8 is a close-up perspective view showing an embodiment of the trailer hitch coupler 13 and locking rod assembly 11 of FIGS. 1-7. As shown in the embodiment of FIG. 8, the locking rod assembly 11 includes a main body 15 having a first end 15a and a second end 15b. Extending from proximal the first end 15a of the main body 15 of the locking rod assembly 11 is a first slidable rod 16 and extending from proximal the second end 15b of the main body 15 of the locking rod assembly 11 is a second slidable rod 17 with slidable rods 16 and 17 extending in a corresponding parallel direction from each other and preferably in a direction perpendicular to the main body 15 of the locking rod assembly 11. Located on an interior side 16a of slidable rod 16 and an interior side 17a of slidable rod 17 are diametrically opposing grooves 18 and 19.

Figure 10:
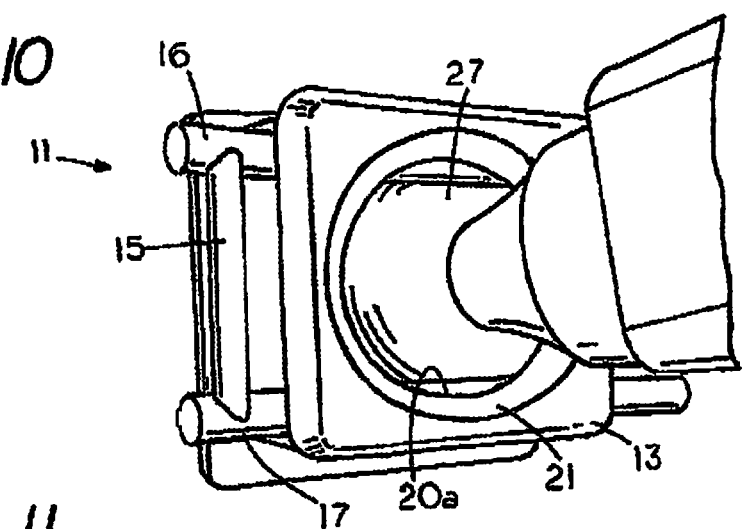
FIG. 10 is a close-up perspective view showing the hitch ball of the towing vehicle in a closed gate or locked condition with the trailer coupler.

The trailer hitch coupler 13 includes a hitch ball socket 20 preferably having a bevel rim 21 to allow for additional play or angular movement between the socket 20 and a shaft portion of a hitch ball, shown in FIGS. 9 and 10. In the embodiment of FIG. 8 the trailer hitch coupler 13 also includes a pair of rail slots 22 and 23 for receiving and supporting a free end 16b and 17b of the corresponding slidable rods 16 and 17 of the locking rod assembly 11 therein.

In regards to the shifting fork, in the present invention the shifting fork 14 is preferably pivotably connected to or pivotally supported by the trailer hitch is some form or another.

For example, in the embodiment of FIGS. 1-3 and 5-7, the shifting fork 14 is shown pivotally mounted to a portion of the trailer coupler 13 of the trailer hitch 12 through the use of a mounting bracket 24. The shifting fork 14 generally includes a hand gripping end 25 and a slotted end 26 having a surface 26a for engaging a portion of the main body 15 of locking rod assembly 11 to guide the locking rod assembly 11 between an open gate condition and a closed gate condition.

FIG. 9 is a partial perspective view showing the locking rod assembly 11 in the open gate condition. FIG. 10 is a partial perspective view showing the locking rod assembly 11 in the closed gate condition. The open gate condition is identified by an alignment of the diametrically opposing grooves 18, 19 of the slidable rods 16 and 17 with an opening of the ball socket 20, and more specifically with a circular opening 20a of the ball socket 20 to allow coupling and decoupling of a hitch ball 27 with the trailer hitch coupler 13 by allowing the hitch ball 27 clearance access through circular opening 20a of the ball socket 20.

The closed gate condition, shown in FIG. 10, is identified by a mis-alignment of the diametrically opposing grooves 18, 19 of the slidable rods 16 and 17 with the opening 20a of the ball socket 20. The aforementioned results in a portion of the slidable rods 16 and 17 blocking a portion of the circular opening 20a of the ball socket 20 to prevent the hitch ball 27 clearance access through circular opening 20a of the ball socket 20.

Referring back to the mounting bracket 24, mounting bracket 24 may include a shifting fork locking mechanism, which functions to maintain the shift fork 14 in either the open gate condition as shown in FIG. 9 or the closed gate condition as shown in FIG. 10. In the embodiment of FIGS. 1-3 and 5-7 the shifting fork locking mechanism is shown comprising a locking pin 28 mountable through either a first locking pin hole 29 or a second locking pin hole 30 located on the mounting backet 24 and a corresponding locking pin hole (not shown) located on the shifting fork 14.

In use of the trailer hitch ball mount locking apparatus 10 of the present invention, to mount a trailer to a towing vehicle the user first pivots the shifting fork 14 to move the locking rod assembly 11 in the open gate condition in which the diametrically opposing grooves 18, 19 of the slidable rods 16 and 17 are in alignment with the circular opening of the ball socket 20. The aforementioned allows for the insertion of hitch ball 27 through the circular opening 20a and into the ball socket 20 thereby coupling of the hitch ball 27 of the towing vehicle with the trailer coupler 13 of a trailer.

Once the hitch ball 27 is coupled with the trailer coupler 3, the user then pivots the shifting fork 14 to move the locking rod assembly 11 to the closed gate condition to prevent the decoupling or displacement of the hitch ball 27 of the towing vehicle from the trailer coupler 13 of the trailer. In the embodiment of FIGS. 1-7, to maintain the locking rod assembly 11 in the closed gate condition the user may mount the locking pin 28 into the first locking pin hole 29 of the mounting bracket 24 and the locking pin hole of shift fork 14. To maintain the locking rod assembly 11 in the opened gate condition the user may mount the locking pin 28 into the second locking pin hole 30 of the mounting bracket 24 and the locking pin hole of shift fork 14.

Figure 11:
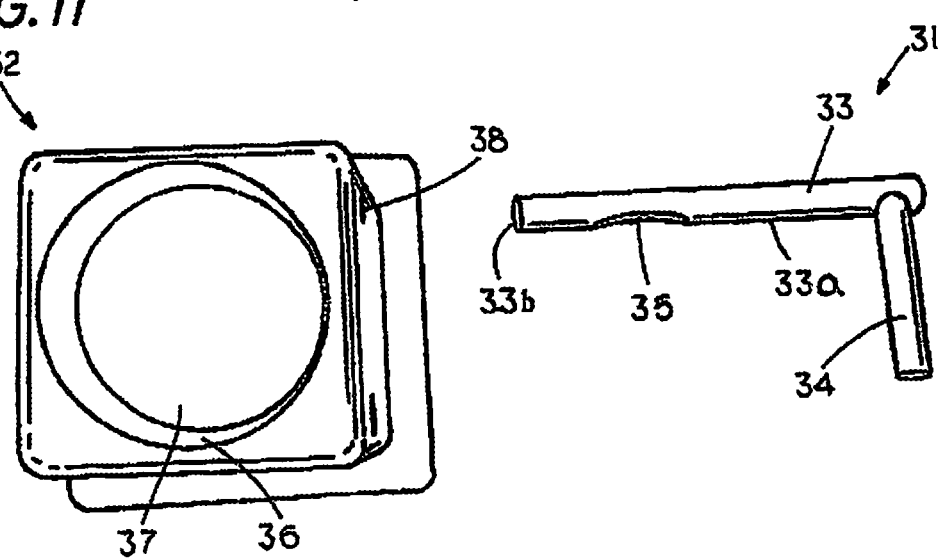
FIG. 11 is a close-up perspective view showing an alternative embodiment of a locking rod assembly and trailer hitch coupler.

FIG. 11 is a close-up perspective view showing an alternative embodiment of a locking rod assembly 31 and trailer hitch coupler 32 having similar general components to the trailer hitch coupler 13 and locking rod assembly 11 shown in FIG. 8. However, in the embodiment of FIG. 11 the locking rod assembly 31 is shown having one slidable rod 33 instead of two slidable rod extending from proximal an end of a main body 34. Trailer hitch coupler 32 is also shown having one rail slot 38 instead of two rail slots for receiving and supporting a free end 33b of slidable rod 33 therein. Similar to locking rod assembly 11, slidable rod 33 includes an interior surface 33a having a groove 35 located thereon for alignment with an opening 36 of a ball socket 37 of trailer hitch coupler 32 to allow coupling and decoupling of a hitch ball with a trailer hitch coupler by allowing the hitch ball clearance access through the opening 36 of the ball socket 32.

I claim:

1. A trailer hitch ball mount locking apparatus comprising:
    a locking rod assembly including a main body having at least one slidable rod extending from proximal an end of said main body in an angled direction to said main body, said slidable rod having an exterior side and an interior side with a groove located on said interior side of said rod;
    a trailer hitch having a trailer hitch coupler with a hitch ball socket and at least one rail slot for receiving and supporting a free end of said at least one slidable rod of the locking rod assembly therein; and
    a shifting fork pivotably connected to said trailer hitch coupler, said shifting fork having a hand gripping end and a slotted end with a surface for engaging a portion of said main body of said locking rod assembly to guide said locking rod assembly between an open gate condition identified by the alignment of the groove of said at least one slidable rod with an opening of said ball socket to allow coupling and decoupling of a hitch ball with said trailer hitch coupler and a closed gate condition preventing the coupling and decoupling of said hitch ball with said trailer hitch coupler.

2. The trailer hitch ball mount locking apparatus of claim 1 wherein said at least one slidable rod comprises a pair of slidable rods extending from proximal a corresponding end of the main body in a parallel direction from each other and said groove located on said interior side of each of said slidable rod comprises a pair of diametrically opposing grooves located on an interior side of each of said slidable rods.

3. The trailer hitch ball mount locking apparatus of claim 1 wherein said slidable rod extends from said main body in a direction perpendicular to said main body.

4. The trailer hitch ball mount locking apparatus of claim 1 wherein said hitch ball socket includes a bevel rim allowing for additional play and angular movement between said hitch ball socket and a shaft portion of the hitch ball.

5. The trailer hitch ball mount locking apparatus of claim 2 wherein said at least one rail slot comprises a pair of rail slots for receiving and supporting a free end of said at least one slidable rod slidable rod of said locking rod assembly therein.

6. The trailer hitch ball mount locking apparatus of claim 1 wherein said shifting fork is pivotably connected to said trailer hitch coupler by a mounting bracket.

7. The trailer hitch ball mount locking apparatus of claim 6 wherein said mounting bracket includes a shifting fork locking mechanism to maintain said shifting fork in either said open gate condition or said closed gate condition.

8. The trailer hitch ball mount locking apparatus of claim 7 wherein said shifting fork locking mechanism comprises a locking pin mountable to at least one locking pin hole located on said mounting backet and a corresponding locking pin hole located on said shifting fork.

9. A trailer hitch ball mount locking apparatus comprising:
    a locking rod assembly including a main body having a first end and a second end and a first slidable rod extending from proximal said first end of said main body and a second slidable rod extending from proximal said second end of said main body of the locking rod assembly, said slidable rods each having a groove located on said rod and positioned diametrically opposing each other;
    a trailer hitch having a trailer hitch coupler with a hitch ball socket having a bevel rim allowing for additional play and angular movement between said hitch ball socket and a shaft portion of a hitch ball, said trailer hitch coupler also including a pair of rail slots for receiving and supporting a free end of each of said slidable rods of the locking rod assembly therein; and
    a shifting fork pivotably connected to said trailer hitch coupler, said shifting fork having a hand gripping end and a slotted end with a surface for engaging a portion of said main body of said locking rod assembly to guide said locking rod assembly between an open gate condition identified by the alignment of said diametrically opposing grooves of said slidable rods with an opening of said ball socket to allow coupling and decoupling of said hitch ball with said trailer hitch coupler and a closed gate condition preventing the coupling and decoupling of said hitch ball with said trailer hitch coupler.

10. The trailer hitch ball mount locking apparatus of claim 9 wherein said slidable rods extend from said main body of the locking rod assembly in a parallel direction from each other.

11. The trailer hitch ball mount locking apparatus of claim 10 wherein said slidable rods extends from said main body in a direction perpendicular to said main body.

12. The trailer hitch ball mount locking apparatus of claim 11 wherein said shifting fork is pivotably connected to said trailer hitch coupler by a mounting bracket.

13. The trailer hitch ball mount locking apparatus of claim 12 wherein said mounting bracket includes a shifting fork locking mechanism to maintain said shifting fork in either said open gate condition or said closed gate condition.

14. The trailer hitch ball mount locking apparatus of claim 13 wherein said shifting fork locking mechanism comprises a locking pin mountable to at least one locking pin hole located on said mounting backet and a corresponding locking pin hole located on said shifting fork.

15. A trailer hitch ball mount locking apparatus comprising:
    a locking rod assembly including a main body having a first end and a second end and a first slidable rod extending from proximal said first end of said main body and a second slidable rod extending proximal said second end of said main body of said locking rod assembly in a corresponding parallel direction with each other and perpendicular to the main body, said slidable rods having diametrically opposing grooves located on an interior side of each of said slidable rods;

a trailer hitch having a trailer hitch coupler with a hitch ball socket having a bevel rim allowing for additional play and angular movement between said hitch ball socket and a shaft portion of a hitch ball, said trailer hitch coupler also including a pair of rail slots for receiving and supporting a free end of each of said slidable rods of the locking rod assembly therein; and a shifting fork pivotably connected to said trailer hitch coupler by a mounting bracket, said shifting fork having a hand gripping end and a slotted end with a surface for engaging a portion of said main body of said locking rod assembly to guide said locking rod assembly between an open gate condition identified by the alignment of said diametrically opposing grooves of said pair of slidable rods with an opening of said ball socket to allow coupling and decoupling of a said hitch ball with said trailer hitch coupler and a closed gate condition preventing the coupling and decoupling of said hitch ball with said trailer hitch coupler.

16. The trailer hitch ball mount locking apparatus of claim 15 wherein said mounting bracket includes a shifting fork locking mechanism to maintain said shifting fork in either said open gate condition or said closed gate condition.

17. The trailer hitch ball mount locking apparatus of claim 16 wherein said shifting fork locking mechanism comprises a locking pin mountable to at least one locking pin hole located on said mounting backet and a corresponding locking pin hole located on said shifting fork.

* * * * *